United States Patent [19]
Robertson et al.

[11] Patent Number: 5,596,347
[45] Date of Patent: Jan. 21, 1997

[54] SYSTEM AND METHOD FOR COMPUTER CURSOR CONTROL

[75] Inventors: Kenneth R. Robertson, Redmond; Paul E. Henderson, Jr., Bellevue, both of Wash.; Samuel H. Smith, Stanford, Calif.; Carl T. Hellings, Redmond, Wash.; James A. Andrews, Issaquah, Wash.; Eric W. Hanson, Bellevue, Wash.; Timothy T. Brewer; Teresa L. Kelsey, both of Seattle, Wash.; Anthony R. Claflin, Bellevue, Wash.; Daniel S. Hoeger, Woodinville, Wash.; Lora K. McCambridge, Bellevue, Wash.

[73] Assignee: Microsoft Corporation, Redmond, Wash.

[21] Appl. No.: 414,210

[22] Filed: Mar. 31, 1995

Related U.S. Application Data

[62] Division of Ser. No. 188,639, Jan. 27, 1994, abandoned.

[51] Int. Cl.⁶ .................................................. G09G 5/08
[52] U.S. Cl. .......................... 345/145; 345/157; 345/159
[58] Field of Search ..................... 345/145, 146, 345/156, 157, 159, 160, 162, 161, 163, 168; 395/155, 156, 159

[56] References Cited

U.S. PATENT DOCUMENTS 4,698,625  10/1987  McCaskill et al. ............... 345/145
4,987,411  1/1991  Ishigami ........................... 345/197
5,198,802  3/1993  Bertram et al. .................. 345/163
5,298,890  3/1994  Kanamaru et al. ............... 345/157
5,398,044  3/1995  Hill .................................. 345/163

*Primary Examiner*—Kee M. Tung
*Assistant Examiner*—Doon Chow
*Attorney, Agent, or Firm*—Seed and Berry LLP

[57] ABSTRACT

A system determining an intended cursor location on the computer display screen and automatically repositions the cursor at the intended location. If the user selects a command that alters the contents of the display, such as opening a new window, the system analyzes the new screen display to determine whether there are user selectable options associated with the new screen display. The system determines if one of the user selectable options is a default option and automatically positions the cursor at the default option. If the new screen display is an application program, the system attempts to locate a user selectable option and repositions the cursor at the user selectable option. When the new window is closed, the system returns the cursor to the position it was at before the new window was opened. The system also predicts an intended location for a screen display that has not been altered, and automatically positions the cursor at the intended location. This feature can be selectively enabled to prevent the inadvertent repositioning of the cursor in the display.

14 Claims, 9 Drawing Sheets

SYSTEM AND METHOD FOR COMPUTER CURSOR CONTROL

CROSS-REFERENCE TO RELATED APPLICATION

This application is a division of U.S. patent application Ser. No. 08/188,639, filed Jan. 27, 1994 now abandoned.

TECHNICAL FIELD

The invention relates generally to a system and method for control of a cursor on a computer display screen.

BACKGROUND OF THE INVENTION

Computers have become common in the work place and at home. Early computer systems required extensive knowledge of computer programming to effectively operate the computer. Newer computers have been designed to permit simplified use by those without formal background in computer science. Operating systems, such as the Microsoft® Windows™ operating system provide a graphical environment that can be used by persons with little or no previous experience in the use of computers. Thus, computers have become easier to operate and their use has become more pervasive.

As computers become even more common, it is important that the computer must become even easier to operate for the person using the computer. For example, the use of a cursor pointing device, such as a mouse, trackball, or the like, permits the easy manipulation of a cursor on the visual display coupled to the computer. However, there are situations in which even the movement of the cursor with a mouse becomes inefficient. Therefore, it can be appreciated that there is a great need for a system and method for controlling the positioning of a cursor on the computer display that simplifies the positioning of the cursor on the visual display.

SUMMARY OF THE INVENTION

The present invention is embodied in a system that control the position of the cursor on a computer display. A first storage area stores the position data corresponding to a first position of the cursor and a first screen display on the computer display. An alteration means alters the first screen display in some manner to generate a second screen display. The second screen display may be generated with the result of opening a computer window, enabling an application program, or selecting a menu item. A second storage area stores the position data corresponding to at least the first intended position of the cursor in the second screen display. Positioning means position the cursor at the first location in the second screen display in response to the generation of the second screen display.

In one embodiment the second storage area stores position data corresponding to a plurality of intended positions of the cursor in the second screen display. The system further includes selection means for selecting one of the plurality of the intended positions as the first location in the second screen display. The selection means may use a flag-bit to select the intended location. Alternatively, the selection means may determine the intended location based on the size and shape of a plurality of objects displayed on the computer display.

The system may further include repositioning means to reposition the cursor at the first position of the first screen display when the computer returns to the first screen display.

The second screen display may include a plurality of predefined locations on the computer display corresponding to a plurality of user selectable options, with the first position in the second screen display corresponding to one of the plurality of predefined locations. The system may further include user selectable means for permitting the user to select one predefined location as the first position in the second screen display. Alternatively, the system may include automatic selection means for automatically selecting one of the predefined locations as the first position in the second screen display. The automatic selection may be based on the previous selection of the predefined location. Alternatively, the automatic selection means may select the predefined location based on a plurality of previous selections of the one predefined location. The plurality of previous selections may be given a time-weighted average to determine the predefined location to be designated as the first position in the second screen display.

In an alternative embodiment, a system for controlling the position of a cursor on a computer display comprises input means for entering cursor position data into the computer, prediction means for predicting an intended user destination of the cursor on the display, and a positioning means for positioning the cursor at the intended user destination upon the prediction means predicting the intended user destination. The prediction means predicts the intended user destination by examining cursor position data to determine a direction of cursor movement and determines whether the direction of cursor movement substantially coincides with a user selectable option, with the user selectable option being designated as the intended user destination if the direction of cursor movement substantially coincides with the user selectable option.

In another alternative embodiment, the system alters the sensitivity of the cursor control device when the cursor is in proximity with a control so that the cursor moves less distance for a given unit of movement of the cursor control device than when the cursor is not in proximity with a control. This advantageously permits the user to more easily position the cursor on the control.

In yet another embodiment, the system determines a correction signal that moves the cursor toward the control when the cursor is in proximity with a control. The correction signal may take the form of a vector added to the cursor control signals. The magnitude of the correction vector may be constant, or dependent on the distance between the position of the control and the cursor on the display. In an alternative embodiment, the magnitude of the correction signal is dependent of the relative importance of controls. Controls are designated as having a relative importance value. The correction signals tend to move the cursor towards controls with a relatively higher importance value.

DETAILED DESCRIPTION OF THE INVENTION

The present invention allows a user to enter commands into a computer with less physical movement of the mouse than is required by systems of the prior art. While the following discussion relates to a mouse, it can readily be appreciated that the principles of the present invention are equally applicable to other cursor pointing devices, such as a trackball, joystick, and keyboard. The invention may be easily incorporated into any computer from a personal computer to a mainframe computer.

The present invention automatically positions a cursor at predetermined locations on a computer visual display in response to user commands. In a graphical environment such as the Windows™ operating system, the present invention can position the cursor in a new predetermined location on the computer display each time that a window is opened or closed. When a new window is opened, or a menu displayed on the computer display, the present invention determines a new location for the cursor and automatically positions the cursor at that location. When the window is closed or the menu selection made by the user, the present invention returns the cursor to the location prior to opening the new window or selecting the menu. The present invention is not limited to a windows environment, but can also operate on computer systems that do not display graphical windows on the computer display. Any change in the computer display, whether caused by opening a window, closing a window, displaying a menu or the like can be considered an alteration in the computer display and is intended to be encompassed by the present invention.

Figure 1:
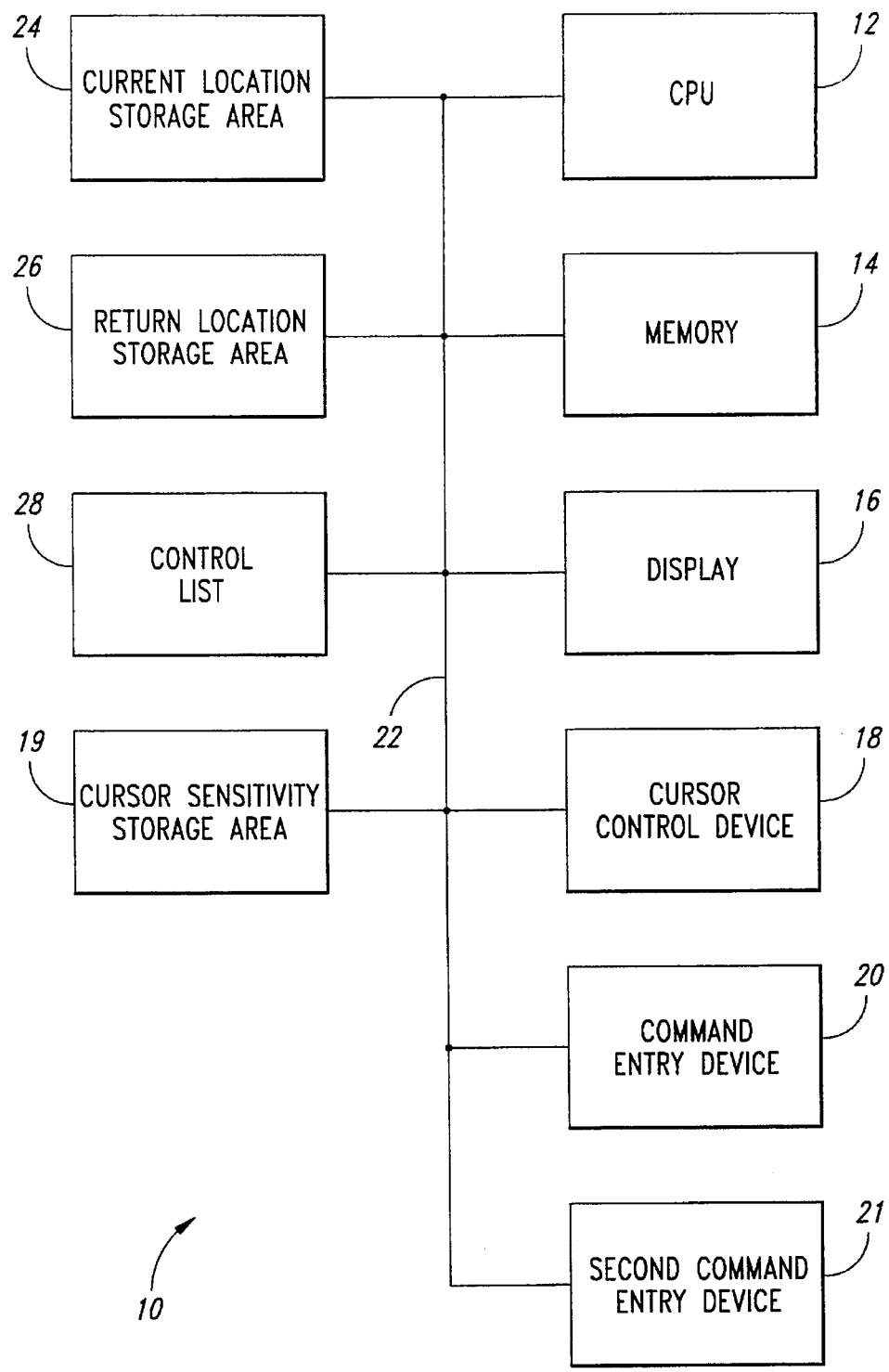
FIG. 1 is a functional block diagram of a system according to the present invention.

The present invention is embodied in a system 10 shown in the block diagram of FIG. 1. A central processing unit (CPU) 12 performs the analysis functions that will be described below. The CPU 12 can be any of a number of well known devices. The system 10 includes a memory 14, which may comprise both random access memory (RAM) and read-only memory (ROM). A computer visual display 16, such as an LED or CRT display, is also included in the system 10. The display 16 typically comprises an array of pixels arranged in two orthogonal dimensions to form a two dimensional display, with X and Y coordinates used to indicate the location of each pixel in the array. The display 16 may be an integral part of the system 10, such as when the system is incorporated into a laptop computer, or may be a stand alone device.

The system 10 also includes a cursor control device 18 that controls the position of a cursor generated on the display 16. The cursor control device 18 may be a mouse, joystick, trackball, keyboard, or the like. The present invention is not limited by the specific form of the cursor control device 18. The cursor control device 18 generates electrical signals indicative of the desired movement of the cursor. The CPU 12 interprets the electrical signals from the cursor control device 18 and alters the current location storage area 24 accordingly. If the cursor control device 18 is a mouse, trackball, or the like, there are generally two electrical signals corresponding to the movement of the cursor control device 18 in two orthogonal dimensions corresponding to the two dimensions on the display 16. The electrical signals from the cursor control device 18 are converted by the CPU 12 into cursor control signals corresponding to X and Y coordinates on the display 16.

The system 10 also includes a cursor sensitivity storage area 19 that contains sensitivity values relating the amount of movement of the cursor control device 18 to the amount of movement of the cursor on the display 16. Typically, the user selects the sensitivity value for both orthogonal dimensions (i.e., the X and Y dimensions) of movement of the cursor control device 18. The CPU 12 uses both the electrical signals from the cursor control device 18 and the sensitivity values in the cursor sensitivity storage area 19 to determine the value of the cursor control signals. A relatively high sensitivity value will result in greater movement of the cursor for a given unit of movement of the cursor control device 18 than will a lower sensitivity value. Typically, the user selects the sensitivity value for both orthogonal dimensions (i.e., the X and Y dimensions).

The system 10 also includes a command entry device 20, which may be a button on the cursor control device 18 or on a keyboard (not shown). The system 10 may also include a second command entry device 21, such as a second button on the cursor control device 18 or on the keyboard (not shown). The user can position the cursor at a desired location on the display 16 and press the command entry device 20 to activate a computer command associated with the selected location on the display. The various components of the system 10 are coupled together by a bus 22, which may carry power as well as data signals.

A current location storage area 24 of the system 10 contains the cursor control signals (i.e., X and Y coordinates) corresponding to the current location of the cursor on the display 16. The current location storage area 24 may be part of the memory 14. If the contents of the display 16 are altered, the system 10 determines a new location for the cursor relative to the altered display and stores the new location in the current location storage area 24. Prior to determining the new location of the cursor and updating the current location storage area 24, the system 10 stores the current location of the cursor in a return location storage area 26 to permit the system 10 to return the cursor to the previous location when the contents of the display 16 are returned to its previous state. The return location storage area 26 may also be part of the memory 14. For example, the system 10 may be used with an operating system such as the Windows™ operating system. When a new window, such as a dialog box window, is opened, the system 10 saves the current location of the cursor in the return location storage area 26 and returns the cursor to its previous location when the new window is closed and the previous window is reopened. In a graphical environment such as the Windows™ operating system, the previous window automatically reopens when the new window is closed. If yet another new window is opened, the system saves a return location for each window that has been opened in the return location storage area 26. Each window will have a return location and identification (window ID) associated with it to permit the return of the cursor to the previous location when the associated window is deactivated. Thus, the user can select options from a plurality of windows without ever having to manually change the location of the cursor on the display 16 by moving the mouse or manipulating the trackball.

The system 10 has a control list storage area 28, which stores a list of possible cursor locations for the new screen display. The contents of the control list storage area 28 corresponds to a list of user selectable options, which may vary from one application to another. For example, the control list storage area 28 may contain a list corresponding to locations of user selectable options such as control button icons or menu items displayed on the display 16. For the sake of convenience, the user selectable options will be referred to herein as controls to indicate that they perform some control function in the software running on the computer. The controls are defined by the specific application in a well known manner that will not be described herein. Generally, one of the controls in the control list storage area 28 will correspond to a predetermined default selection for the particular application. In an operating system such as the Windows™ operating system, the default selection is indicated by a flag data bit, which is also stored in the control list storage area 28. The system 10 steps through the control list storage area 28 to determine if there is a default selection of one of the controls for the new screen display. If a default selection is found by the system 10, the system positions the cursor at the location on the display 16 corresponding to the default selection. It should be noted that in a graphical environment, such as the Windows™ operating system, the position of the control is fixed relative to the corresponding window. If the window itself is repositioned on the display 16, the location of the control on the display will also change to maintain the fixed position relationship to the window. If no default selection is found, the system 10 will not reposition the cursor when the new screen display is displayed. If the new screen display is part of an application program, the system 10 will examine the new screen display to determine if any objects in the new screen display correspond to controls. The system 10 analyzes the size and shape of objects in the new screen display to determine if any objects correspond to controls. Alternatively, application programs written for a graphical environment, such as the Windows™ operating system, may indicate the default selection using a flag data bit, as described above. It should be noted that the controls may be button icons, menu items, or the like. Alternatively, the user can select a default location such as a cell in a database application program. The system 10 improves the efficiency of operation and enhances the functionality of cursor movement by positioning the cursor at a location that permits the user to perform additional functions without additional manipulation of the cursor control device 18. The present invention is not limited by the specific form in which the controls are displayed.

The system 10 permits the user to manually select the default selection for a screen display. The selection of a new default selection can be accomplished by a number of well known techniques. One such example is the display of a dialog box asking the user if user wishes to make the current selection the default selection. Another example is the use of a second command entry device (not shown), such as a second button on the cursor control device 18, a button on the keyboard (not shown), or the like, to indicate to the system 10 that the user is selecting a different selection as the default selection. The new default selection can be marked with the flag data bit, as described above.

The system 10 includes a mechanism for the automatic determination of a default selection based on previous usage. This dynamic adaptive process is particularly useful in situations where the user is less familiar with computer operations and cannot manually change the default selection easily. For example, in one mode of operation, the system 10 designates the previously used selection for a particular screen display as the default selection the next time that the particular screen display is shown on the display 16. The automatic selection of the default selection can also be based on other forms of previous usage, such as an average of several previous selections or a time-weighted average of several previous selections for a particular screen display. More recent selections from among the plurality of selections are given greater weight when calculating a time-weighted average. Those skilled in the art will appreciate that other techniques could be used for determining the most likely user selection from among the plurality of controls. Such techniques are intended to be encompassed by the present invention. The system 10 positions the cursor at the default selection, whether the default selection is manually selected by the user, automatically selected by the system, or by some combination of user selection and automatic selection.

Figure 2A:
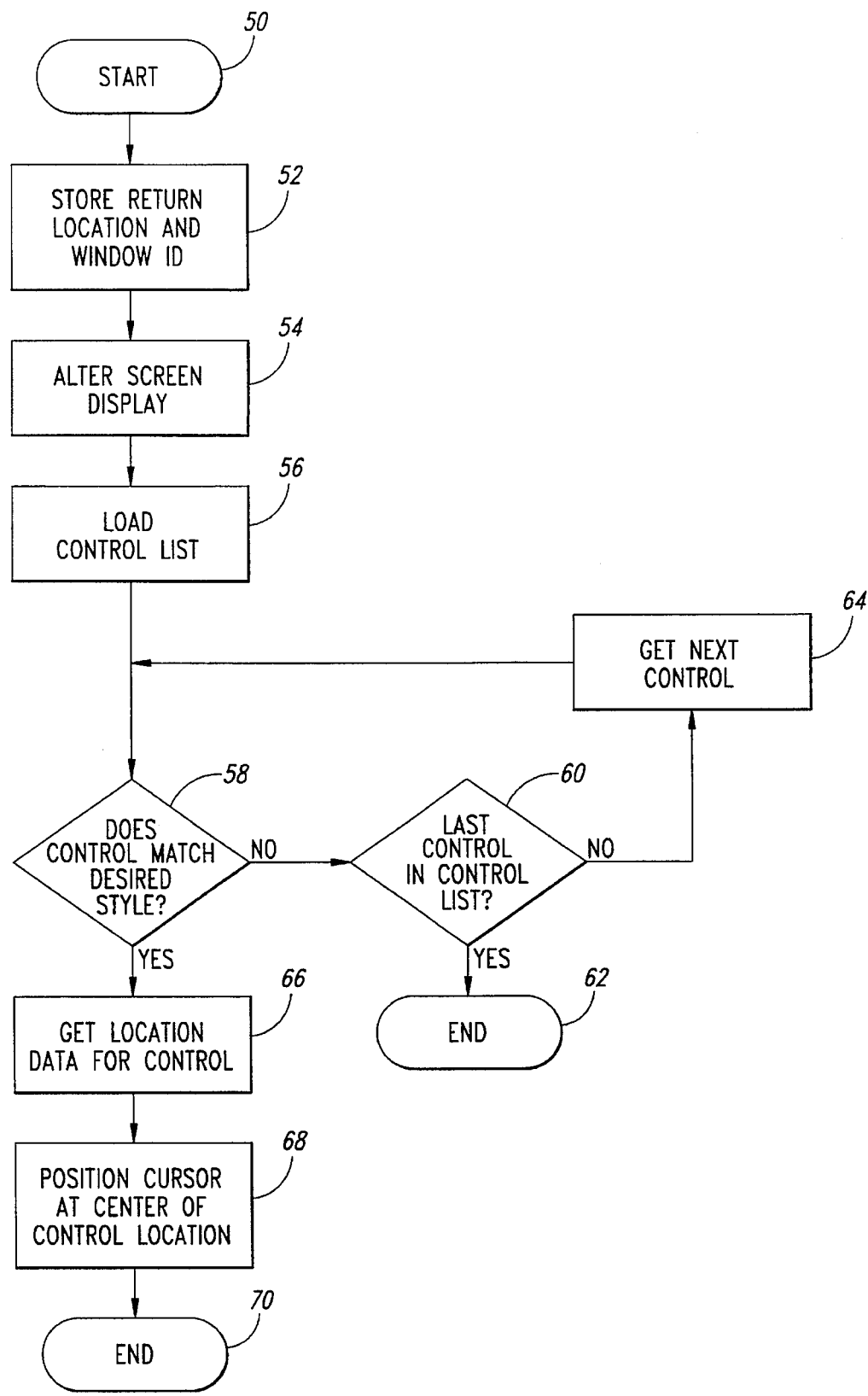
FIG. 2A is a flow chart of the operation of the system of FIG. 1 when opening a new window.

The operation of the system 10 may be best illustrated in the flow chart of FIG. 2A, taken in conjunction with the sample screen displays of FIGS. 3A to 3D. The system 10 may be activated by a user command or by auto loading the software that operates the system whenever the user begins operation on the computer. At the start 50, shown in FIG. 2A, the display 16 has a first window 29 activated. The display 16 includes a cursor 30, shown in FIG. 3A as an arrow, and may also include one or more controls, such as a FILE button 32. The user selects a function associated with the FILE button 32, by positioning the cursor 30 over the FILE button 32 and depressing the command entry device 20 (see FIG. 1). In response to the selection of the FILE button 32, the system 10 stores the current location of the cursor 30 in the return location storage area 26 in step 52. As previously discussed, the system 10 uses the data stored in the return location storage area 26 to reposition the cursor 30 at its original location after the user selects a control or a newly activated window is deactivated.

In step 54, the system 10 alters the screen display on the display 16 in response to the user selection or activation of a new window. This altered display is shown in FIG. 3B where a plurality of controls associated with the FILE button 32 are displayed. The controls are predefined by the particular software program running on the computer and can vary from one window to the next. In the example of FIG. 3B, the controls include a NEW button 34, which is used to create a new file, an OPEN button 36, which is used to open an existing file, and a CLOSE button 38, which is used to close an open file. In step 56, the various controls are loaded in the control list 28 (see FIG. 1) when the contents of the display 16 are altered. The locations of the controls on the display 16 are also predefined by the particular software program running on the computer. In the example of FIG. 3B, the NEW button 34 is the default selection.

The system 10 sequentially analyzes the controls in the control list 28 (see FIG. 1) to select a location at which the cursor 30 will be positioned. In decision 58, the system 10 determines if the control being analyzed matches a desired style. The term "desired style" refers to the specific features that the controls may have. As previously discussed, the type of controls in the control list 28 may vary from one computer operating system to another. The process of matching the controls to the desired style depends on the particular operating system and on other factors, such as whether the new screen display is a new window, a menu, or an application program. For example, certain software such as the Windows™ operating system, has a flag data bit associated with the default selection, as previously discussed. The system 10 uses the data flag bit to identify the default selection. In this example, the data flag bit identifies the control with the desired style. In an application program, the display 10 may not have a data flag bit to identify the default selection. In such situations, the system 10 analyzes the data on the display 16 and attempts to identify patterns such as a button, menu item, or other control. In this example, the desired style is a pattern on the display 16 that appears like a button, menu item, or other control.

If the control being analyzed does not match the desired style, the result of decision 58 is NO. In that event, the system 10, in decision 60, determines if the control being analyzed in the control list 28 is the last control in the list. If the control in the control list 28 is the last control, the result of decision 60 is YES, and the system 10 ends the process in step 62 without repositioning the cursor 30 (see FIG. 3B). If the control being analyzed is not the last control in the control list 28, the result of decision 60 is NO, and in step 64, the system 10 gets the next control from the control list 28 (see FIG. 1) and returns to decision 58.

If the control being analyzed does match the desired style, the result of decision 58 is YES. In that event, the system 10 gets location data for the selected control in step 66. The location data for each control is provided to the operating system by the individual application programs. This information is stored in the memory 14 (see FIG. 1) and can be retrieved by the system 10. In step 68, the system positions the cursor 30 (see FIG. 3B) at the center of the selected control location on the display 16. In the example, of FIG. 3B, the system 10 positions the cursor 30 at the center of the NEW button 34. The system 10 ends the process of positioning the cursor 30 in step 70. Thus, the cursor 30 is automatically positioned at the default location whenever the user opens a new window. In FIG. 3B, the user selects the FILE button 32, and the system 10 automatically positions the cursor 30 at the NEW button 34. Thus, the system 10 eliminates the time required to manually reposition the cursor and may reduce the fatigue experienced by the operator when manually repositioning the cursor.

The user may next select the NEW button 34 in FIG. 3B by simply pressing the command entry device 20 (see FIG. 1). If the user wishes to select a control other than the NEW button 34, the user manually positions the cursor 30 to another selection, such as the CLOSE button 38, as shown in FIG. 3C. If the user selects the CLOSE button 38, the system 10 will follow the procedure discussed above when displaying a dialog box 40, such as shown in FIG. 3D. The dialog box 40, which is essentially a new window, displays a message to the user asking if the user wishes to save the contents of the file. In addition, the dialog box 40 contains a YES button 42, which causes the computer to save the contents of the file before closing the file. A NO button 44 causes the computer to close the file without saving it, and a CANCEL button 46 cancels the selection of closing of the file. In the example of FIG. 3D, the YES button 42 is the default selection because the user generally wants to save any changes to the open file. When the dialog box 40 is opened, the system 10 positions the cursor 30 at the center of the YES button 42. The user may next select the default selection by simply pressing the command entry device 20 (see FIG. 1) if the user wishes to select the YES button 42.

If not, the user may move the cursor 30 using the cursor control device 18 to another control and select that control by pressing the command entry device 20.

As previously discussed, the system 10 repositions the cursor 30 at its previous location when a new window is closed or a menu item is selected. When the user selected the CLOSE button 38 in FIG. 3C, the software running on the computer altered the display 16 to delete the NEW button 34, the OPEN button 36, and the CLOSE button 38. However, the system 10 will not return the cursor 30 to the previous location shown in FIG. 3A (i.e., the FILE button 32) because selection of the CLOSE button 38 caused the display 16 (see FIG. 1) to display another new window (i.e., the dialog box 40), as shown in FIG. 3D. Thus, the display 16 has not returned to the display shown in FIG. 3A, and the cursor 30 will not be repositioned at the FILE button 32.

Figure 3A:
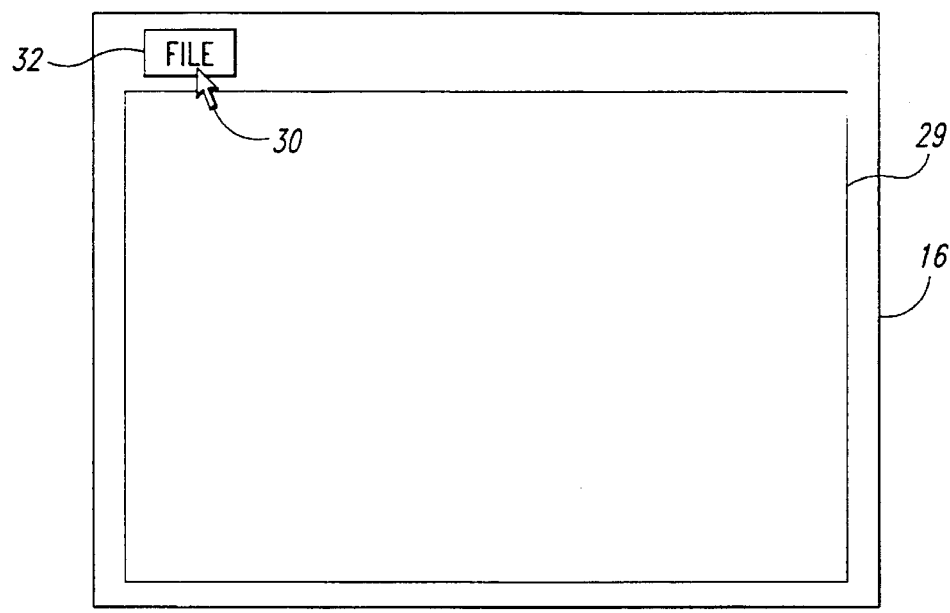
FIGS. 3A through 3D are sample screen displays illustrating the operation of the system of FIG. 1.
Figure 3B:
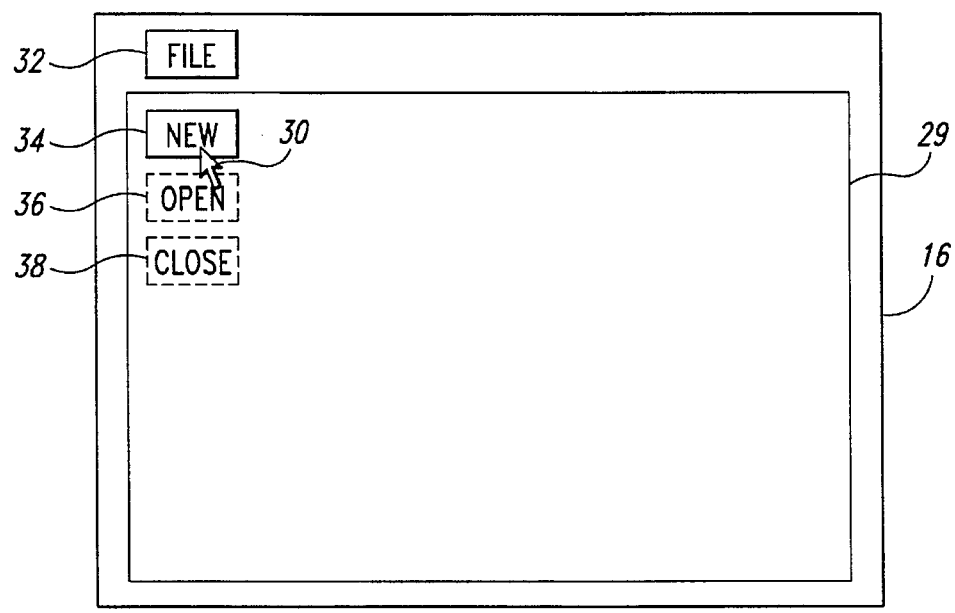
Figure 3C:
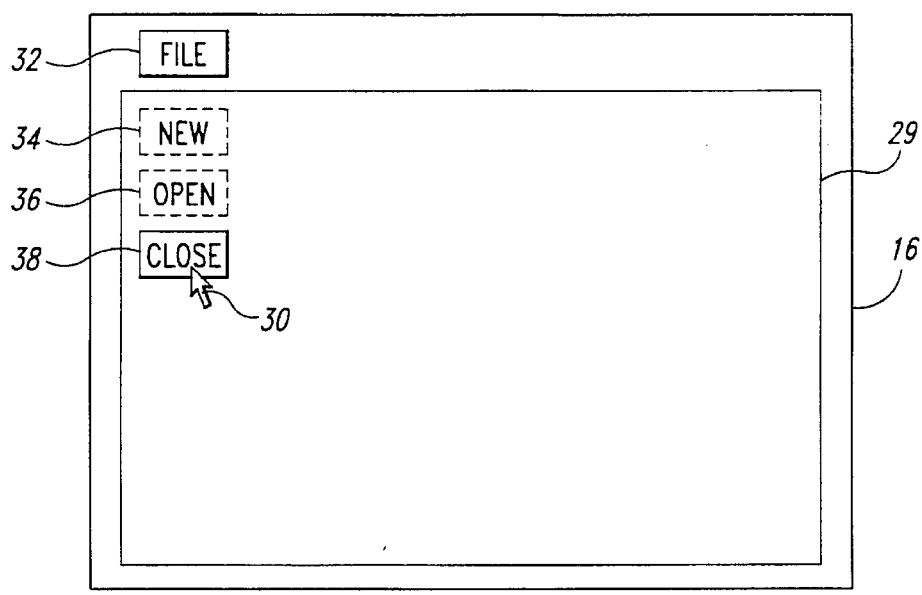
Figure 3D:
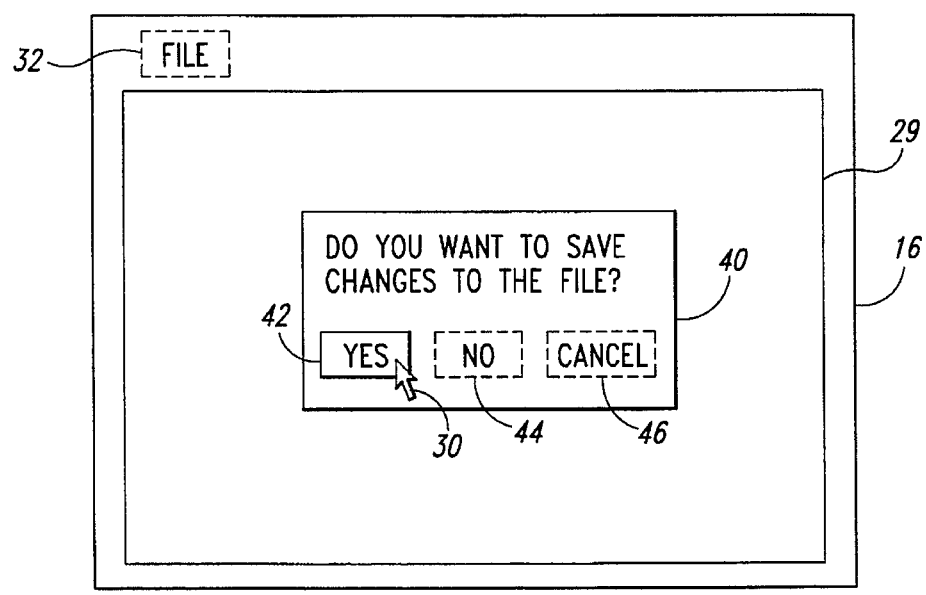

However, when the user makes a selection from one of the YES button 42, the NO button 44 or the CANCEL button 46 in FIG. 3D, the computer will close the dialog box 40, which returns the display 16 to the display shown in FIG. 3A with the cursor 30 being repositioned over the FILE button 32. This occurs because the system 10 uses the data stored in the return location storage area 26 (see FIG. 1) to reposition the cursor 30 to the location that it was at when the display 16 had the appearance shown in FIG. 3A.

Figure 2B:
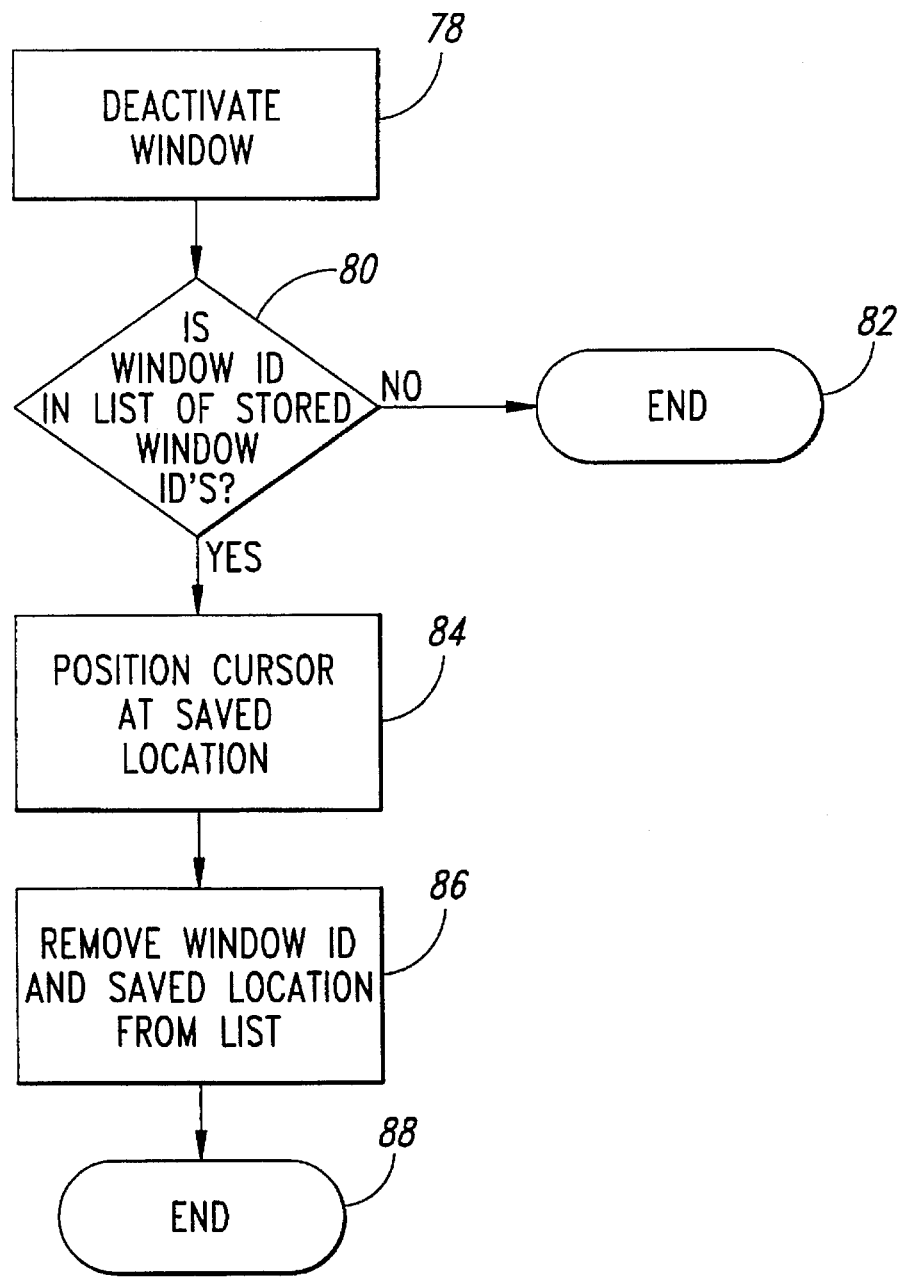
FIG. 2B is a flow chart of the operation of the system of FIG. 1 when closing a window.

The operation of the system 10 when closing a window is illustrated in the flowchart of FIG. 2B. The system 10 starts at step 78 with the deactivation of the current window (e.g., the dialog box 40 in FIG. 3D). The deactivation may occur automatically as a result of the user selecting an option, such as selecting the YES button 42 in FIG. 3D, or may occur as the result of the user manually closing a window in a manner well known to those skilled in the art.

In decision 80, the system compares the window ID for the current window with the list of stored window IDs. to determine if the current window ID is on the list of stored window IDs. As previously discussed, the window ID and return location are stored in the return location storage area 26 (see FIG. 1). If the window ID is not on the list of stored window IDs, the result of decision 80 is NO. In that event, the system 10 ends the process of deactivating the window in step 82, and does not reposition the cursor 30. If the window ID is on the list of stored window IDs, the result of decision 80 is YES. In that event, the system 10 positions the cursor 30 to the return location associated with the particular window ID in step 84. In step 86, the system 100 removes the window ID and return location from the return location storage area 26 (see FIG. 1). The system 10 ends the process of closing a window in step 88.

The system 10 allows the user to rapidly select several options without ever having to manually reposition the cursor. While the above examples of the system 10 relate to a series of windows on the display 16, those of ordinary skill in the art will readily appreciate that the present invention is not limited to a situation in which the computer displays data in the form of windows.

The above examples illustrate the use of the system 10 to reposition the cursor whenever the display 16 is altered, whether by opening a new window, selecting a menu option, or the like. The system 10 can also reposition the cursor to a predetermined location on the display 16 even though the display has not been altered. As described in greater detail below, the system analyzes the cursor movement when the user is operating the cursor control device 18 and predicts the intended predetermined location based on the cursor movement. When the system 10 predicts the intended location, it automatically repositions the cursor at the predicted intended location. For example, if the user is moving the cursor toward the FILE button 32, shown in FIG. 3A, the system 10 can automatically reposition the cursor 30 at the location of the FILE button 32 on the display 16 thus saving the user the time required to actually reposition the cursor at the intended location manually. This is particularly useful in situations where the current location of the cursor 30 on the display 16 is a long distance from the intended location, which may require the user to manually manipulate the cursor control device 18 (see FIG. 1) extensively to reposition the cursor at the desired location.

The system 10 includes an enabling mechanism that enables the system to predict the intended location when the display 16 has not been altered. The selective enabling of this aspect of the invention prevents the system 10 from inadvertently repositioning the cursor to a predicted intended location when the user is simply moving the cursor to some location other than one of the predetermined locations on the display 16. The enabling mechanism may be a menu selection that enables the prediction of the intended location, or the second command entry device 21 (see FIG. 1). When the second command entry device 21 is used, the user depresses the second command entry device 21 to enable the automatic prediction of the intended location while manipulating the cursor control device 18. The system 10 then automatically predicts the intended location of the cursor and repositions the cursor at the predicted intended location. When the user is not depressing the second command entry device 21, the system 10 does not predict the intended location. The automatic positioning of the cursor 30 when the display 16 is altered is not affected by the enabling mechanism described above.

Alternatively, the system 10 can be designed to always predict an intended location, and the second command entry device 21 used to instruct the system 10 to reposition the cursor at the predicted intended location. In this manner, the system 10 always calculates the predicted intended location, but will not reposition the cursor at the predicted intended location unless the automatic repositioning feature is enabled.

Figure 4:
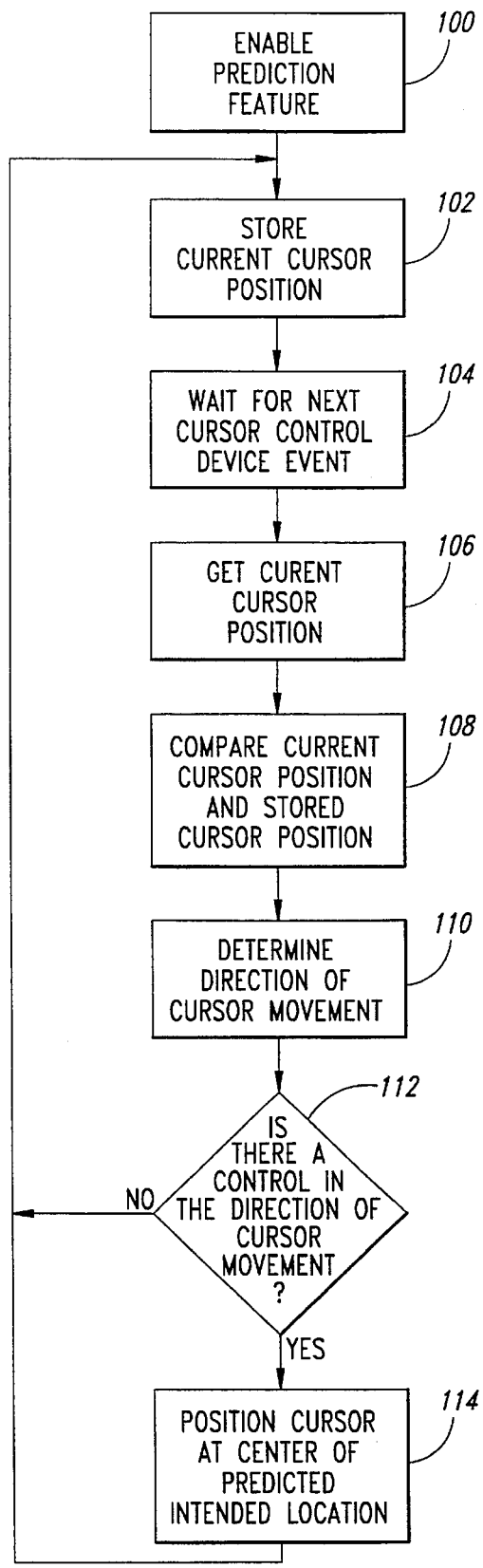
FIG. 4 is a flow chart of the operation of the system of FIG. 1 when predicting an intended user location in an unaltered screen display.

The operation of the prediction feature of the system 10 is illustrated in the flowchart of FIG. 4. In step 100, the user enables the prediction feature in a manner described above. In step 102, the system stores the current cursor position, which may be stored in the memory 14 (see FIG. 1). In step 104, the system waits for the next cursor control device event, such as an interrupt. In step 106, the system 10 gets the current cursor position. In step 108, the system 10 compares the current cursor position with the stored cursor position. In step 110, the system 10 determines the direction of cursor movement based on the current cursor position and a stored cursor position. In decision 112, the system determines whether there is a control in the direction of cursor movement. In the presently preferred embodiment, the system 10 scans through a predetermined angle (e.g., plus or minus 5°) from the current cursor position along the direction of cursor movement. The scan angle can be selected by the user depending on the type of screen display. The present invention is not limited by the particular scan angle. If there is no control within the scanned area, the result of decision 112 is NO, and the system returns to step 102 and repeats the operation described above. If there is a control within the scanned area, the result of decision 112 is YES. In that event, the control that falls within the scanned area is designated as the predicted intended location. If more than one control is present within the scanned area, the system 10 designates the control closest to the actual direction of cursor movement as the predicted intended location. In step 114, the system 10 positions the cursor at the center of the predicted intended location. Following step 114, the system returns to step 102 and continues the process described above.

The system 10 also can dynamically alter the cursor control signals used to position the cursor 30 on the display 16 in order to simplify the process of positioning the cursor on a control. In one embodiment, the system 10 dynamically alters the sensitivity values stored in the cursor sensitivity storage area 19 (see FIG. 1) when the cursor 30 is positioned over a control on the display 16. As previously described, the user can adjust the sensitivity value so that one unit of movement of the cursor control device 18 corresponds to a selected number of units of movement of the cursor 30 on the display 16. The greater the sensitivity values, the greater the movement of the cursor 30 for a given amount of manipulation of the cursor control device 18. The CPU 12 responds to both the electrical signals generated by the cursor control device 18 and the sensitivity values to determine data values, or cursor control signals, for the cursor 30 and alters the current location storage area 24 accordingly. In normal operation, the sensitivity values have been predetermined or selected by the user, and are stored in the cursor sensitivity storage area 19 (see FIG. 1).

When the cursor 30 is in proximity with a control, the system 10 decreases the sensitivity values by a factor of ten so that one unit of movement of the cursor control device 18 will result in only one tenth of the movement of the cursor 30 than previously obtained. The cursor 30 in effect slows down when passing in proximity with a control. The position of the controls are obtained from the control list 28 (see FIG. 1). In the currently preferred embodiment, the sensitivity values are altered only when the cursor 30 is actually over the position of the control on the display 16. As can readily be appreciated, the region in which the sensitivity values are altered, and the amount of change in the sensitivity values are not limited to the particular example presented above.

Figure 5:
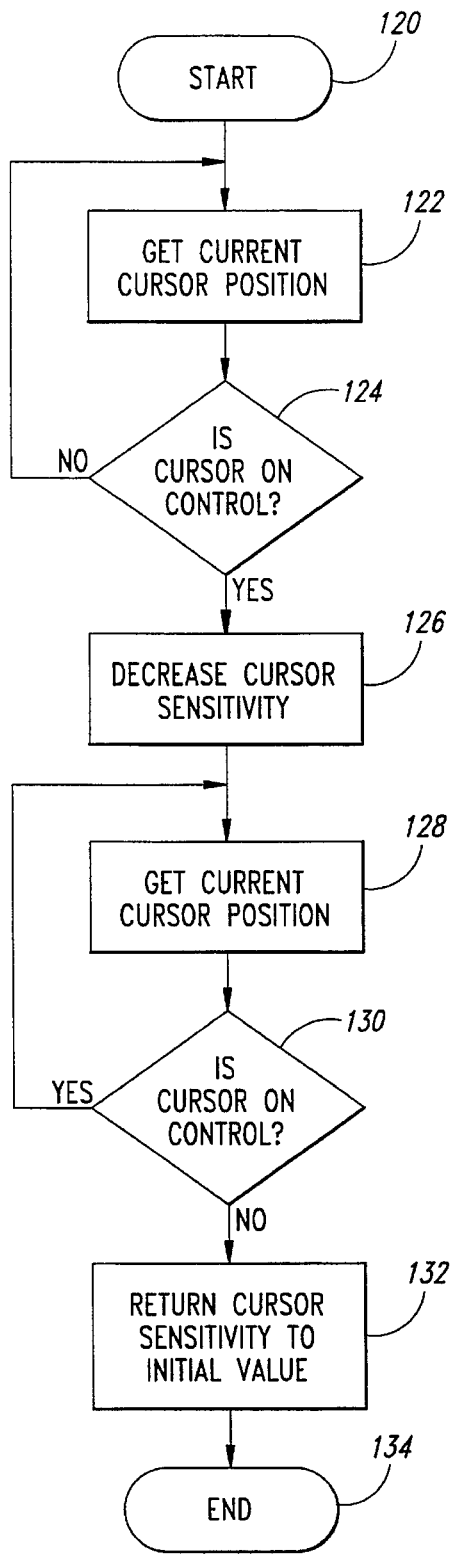
FIG. 5 is a flow chart of the operation of the system of FIG. 1 when positioning the cursor in proximity with a control.

The operation of the system 10 in this embodiment is illustrated in the flowchart of FIG. 5. The system 10 begins operation at the start 120. In step 122, the system 10 gets the current cursor position, which is stored in the current location storage area 24 (see FIG. 1). In decision 124, the system determines whether the current position of the cursor coincides with the position of a control on the display 16. If the current cursor position does not correspond to the position of a control on the display 16, the result of decision 124 is NO and the system returns to step 122. If the current cursor position does correspond to the position of a control on the display 16, the result of decision 124 is YES. In that event, the system 10 decreases the cursor sensitivity values in step 126. As previously described, the cursor sensitivity values are stored in the cursor sensitivity storage area 19 (see FIG. 1).

In step 128, the system 10 gets the current cursor position from the current location storage area 24. In decision 130, the system 10 determines whether the current position of the cursor still coincides with the position of a control on the display 16. If the current cursor position does coincide with the position of a control on the display 16, the result of decision 130 is YES. In that event, the system returns to step 128 and maintains the sensitivity values at the decreased level. If the current position of the cursor no longer coincides with the position of a control on the display 16, the result of decision 130 is NO. In that event, the system 10 returns the cursor sensitivity values to their initial values in step 132. The system 10 ends the process in step 134. Thus, the cursor appears to slow down whenever its position on the display 16 coincides with the position of a control. This techniques simplifies the process of positioning the cursor 30 on a control. This is especially useful for new users who may not be familiar with operation of the cursor control device 18 or with small children who may not have the motor skills to quickly and accurately position the cursor on a small control on the display 16.

Figure 6:
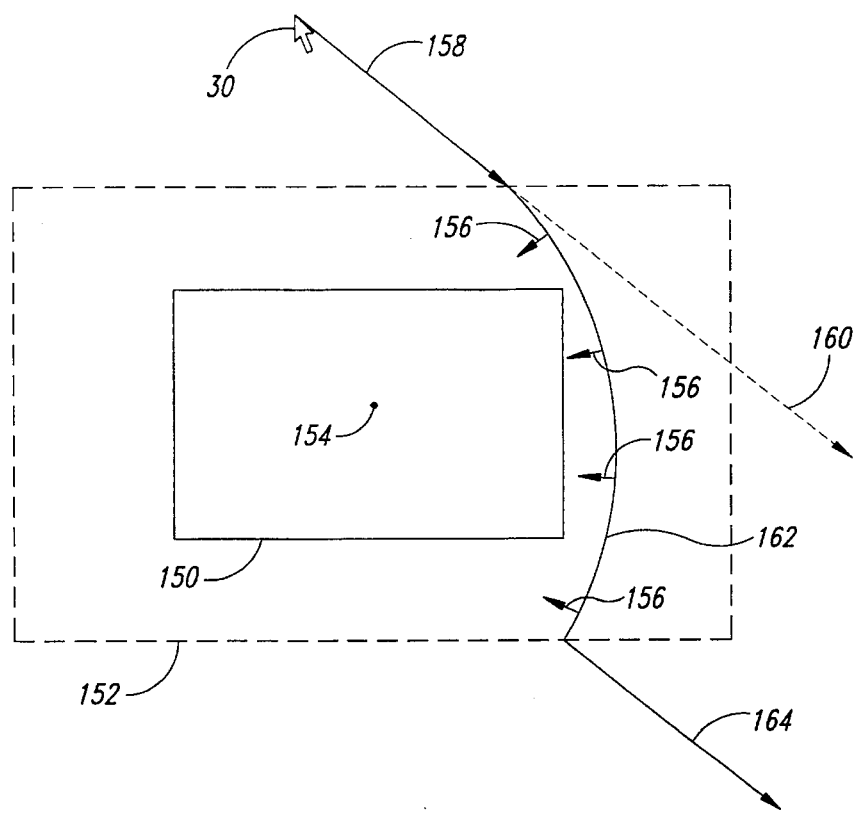
FIG. 6 is a sample screen display enlarged to illustrate the operation of the system of FIG. 1 to generate correction signals to position the cursor on a control.

In another alternative embodiment, the system 10 directs the cursor 30 to a control, but does not calculate an intended position and reposition the cursor at the intended position as previously described. Instead, the system 10 adds a correction signal to the cursor control signals calculated by the CPU 12 when the cursor is in proximity with a control. As shown in FIG. 6, a control 150 on the display 16 is surrounded by a predetermined control region 152. Whenever the cursor 30 is outside of the control region 152, the system 10 does not add any correction signal to the control signals. However, when the cursor 30 is within the control region 152, the system 10 determines the position of the cursor relative to a center point 154 of the control 150 and generates the correction signal in the form of a correction vector 156 having X and Y components that are added to the cursor control signals. The system 10 calculates the correction vector 156 each time that the current position of the cursor 30 is determined. The correction vector 156 causes the cursor 30 to move toward the center point 154 of the control 150 whenever the cursor is within the control region 152.

The effect of the correction vector 156 may be seen in FIG. 6 where the initial direction of movement of the cursor 30 is illustrated by the arrow 158. When the cursor 30 is outside the control region 152, the system 10 does not generate any correction signal and the movement of the cursor continues in a straight line. If the system 10 did not generate correction signals, the cursor 30 would continue to move through the control region 152 in the direction indicated by the arrow 160. However, when the cursor 30 is within the control region 152, the system 10 calculates the correction vector 156 and adds it to the cursor control signals. The correction vector 156 points toward the center point 154 of the control 150 and thus tends to cause the cursor 30 to move toward the center point 154. As previously described, the CPU 12 (see FIG. 1) uses the electrical signals generated by the cursor control device 18 and the sensitivity values stored in the cursor sensitivity storage area 19 to generate the cursor control signals in the form of X and Y coordinates. The CPU 12 adds the X and Y components of the correction vector 156 to the cursor control signals to cause the cursor 30 to move toward the center point 154 of the control 150.

The effect of the correction vector 156 may be analogized to the effect of gravity where the cursor 30 is "attracted" to the control 150. In this analogy, the control region 152 is the space in which the "gravitational effect" of the control 150 is felt by the cursor 30. If the user continues to manipulate the cursor control device 18 past the control 150 so that the cursor 30 travels out of the control region 152, the cursor 30 will resume moving in the direction indicated by the arrow 164. It should be noted that the direction of movement of the cursor 30 indicate by the arrow 164 is identical to the direction of movement indicated by the arrow 158. Thus, the user can continue to move the cursor 30 on the display 16 in the desired direction, with the correction vector 156 having an effect only within the control region 152.

It should be noted that some cursor control devices generate interrupts to the CPU 12 regardless of whether there is movement of the cursor control device, while other cursor control devices generate interrupts only when there is movement of the cursor control device by the user. In the presently preferred embodiment, the system 10 only generates the correction vector 156 if there is movement of the cursor control device 18. If the system 10 would always adds the correction vector 156 regardless of whether or not the user manipulates the cursor control device 18, the cursor 30 would be automatically drawn to the center point 154 if the cursor is positioned within the control region 152 and not moved by the user.

Figure 7:
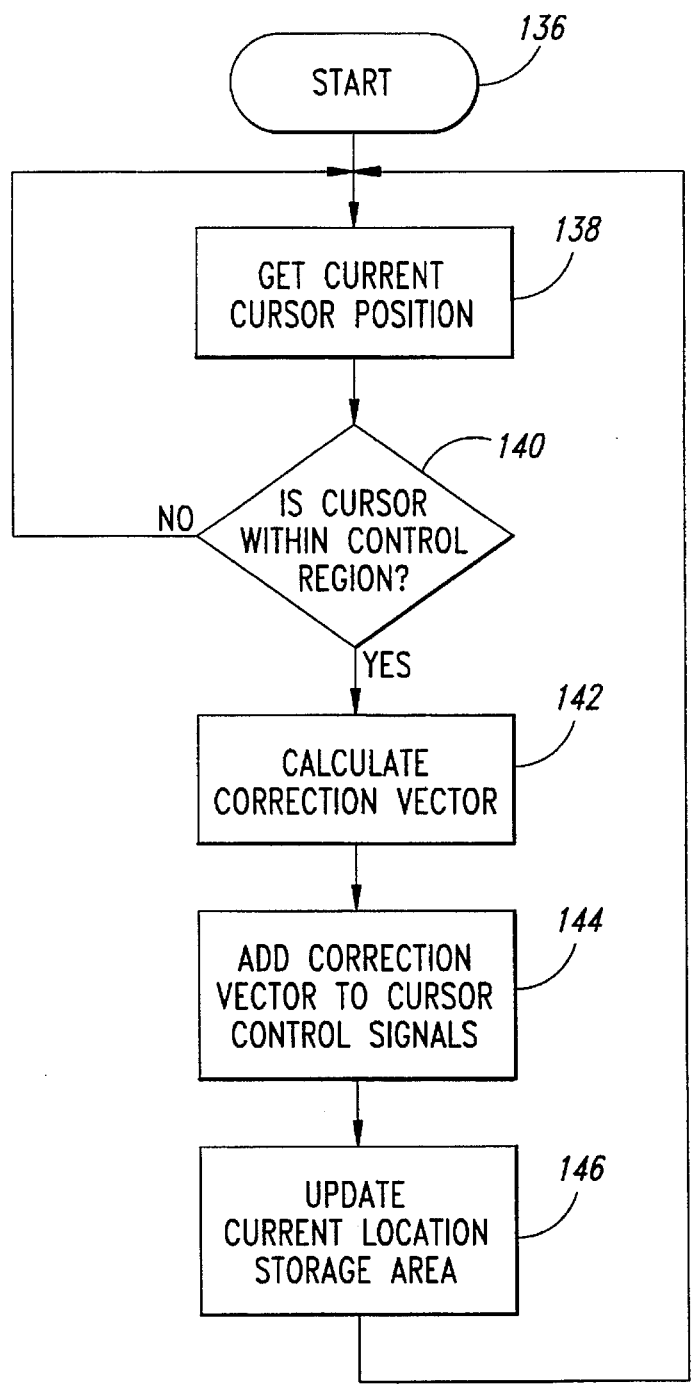
FIG. 7 is a flow chart of the operation of the system of FIG. 1 when calculating correction signals to position the cursor on a control.

The use of the correction vector 156 by the system 10 is described in the flowchart of FIG. 7. The system 10 begins operation at the start 136. In step 138, the system gets the current cursor position from the current location storage area 24 (see FIG. 1). In decision 140, the system 10 determines whether the cursor 30 is within the control region 152 (see FIG. 6). If the cursor is not within the control region 152, the result of decision 140 is NO, and the system returns to step 138. If the current position of the cursor is within the control region 152, the result of decision 140 is YES. In that event, in step 142 the system 10 calculates the correction vector 156 (see FIG. 6) which will cause the cursor 30 to move toward the center point 154 (see FIG. 6). The magnitude of the correction vector 156 may be calculated by a number of different techniques, as will be described below.

In step 44, the system 10 adds the correction vector 156 to the cursor control signals. In step 146, the system 10 updates the current location storage area 24 (see FIG. 1) so that the cursor 30 now has a new position on the display 16. The new position of the cursor 30 includes the contribution of the correction vector 156. Following step 146 the system returns to step 138. It should be noted that the cursor position is continuously updated by the system 10 so that the cursor 30 appears to be moving across the display 16 with a smooth motion. The error vector 156 is calculated each time that the cursor position is updated so long as the cursor 30 is within the control region 152. Thus, the system 10 only calculates the correction vector 156 when the cursor 30 is within the control region 152.

The correction vector 156 can be calculated in a variety of manners that are well known in the art and which will not be described in detail herein. One such technique is to calculate the relative position of the cursor 30 with respect to the center point 154 and generate the correction vector 156 with a constant magnitude and a direction toward the center point 154 from the current position of the cursor. Alternatively, the system may actually use the formula for gravitational attraction between two bodies, which is defined by the following:

$$G = m_1 m_2 / d^2$$

where $m_1$ and $m_2$ are the masses of the two bodies, respectively, and d is the distance separating the two bodies. As can be seen from the above formula, the gravitational attraction is inversely proportional to the square of the distance separating the two bodies. The magnitude of the correction vector 156 correspond to the gravitational value, G, while the "mass" of the control 150 corresponds to the relative importance of the control.

In this embodiment, the cursor 30 is designated as having a constant importance value for its "mass", while different controls on the display 16 (see FIG. 1) may have different mass values depending on factors such as the relative frequency of previous selection of a control or whether the control is the default selection. A default selection has greater importance and is thus designated as having a greater mass value than other, less important controls. The effect of the different mass values causes the cursor 30 to be "attracted" to the default selection rather than some other nearby control. Similarly, controls that have greater frequency of use are designated as having greater mass values thus causing the cursor 30 to be attracted to the controls that are selected by the user more frequently.

Figure 8:
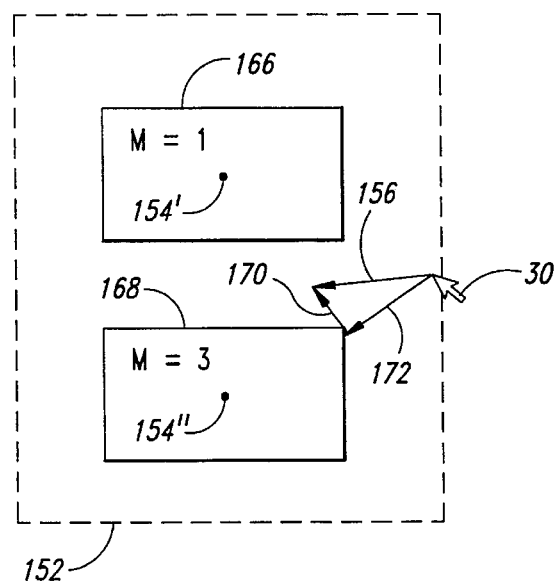
FIG. 8 is a sample screen display enlarged to illustrate the operation of the system of FIG. 1 to generate variable magnitude correction signals to position the cursor on a control.

The "gravitation effect" of the controls is illustrated in FIG. 8 where the cursor 30 is within the control region 152 and equidistant from the center point 154' of control 166 and the center point 154" of control 168. In the example of FIG. 8, the control 168 is a default value and has a designated importance value (i.e., mass value) of three, while the control 166 has a designated importance value of one. The system 10 calculates a correction vector 170 in a direction toward the center point 154' of the control 166 and a correction vector 172 in a direction toward the center point 154" of the control 168. The magnitude of the correction vector 172 is three times larger than the correction vector 170 because of the higher importance value of the control 168. The two correction vectors 170 and 172 are summed to produce the correction vector 156. The net effect of the two correction vectors 170 and 172 on the cursor 30 is that the cursor is "attracted" or directed toward the control 168 with the higher importance value. As the cursor 30 is moved closer to the control 168, the correction vector increases in magnitude because of the inverse distance square contribution of the distance between the cursor and the center point 154' of the control 166 in the gravitational formula.

The importance value for a control can be dynamically altered when the user selects a particular control. For example, a set of controls may initially have identical importance values. However, when the user selects a particular one of the controls its importance value is increased relative to the other controls thus making it easier for the user to make the same control selection at a later time. The more often the particular one control is selected by the user, the more the cursor 30 tends to travel toward the control. The system 10 calculates the correction vector based on the distance between the cursor 30 and the center point 154 as well as the importance values for controls 166 and 168. Thus, the magnitude of the correction vector 156 depends on the distance of the cursor 30 from the controls 166 and 168 as well as the relative importance values of the controls.

As is apparent to those skilled in the art, other formulae could be used to determine the magnitude of the correction vector based on the relative importance of various controls on the display 16. It should be noted that the display 16 in the examples presented above display data in a two-dimensional format. However, the principles of the present invention are equally applicable to a display 16 which can display data in a three dimensional format.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for controlling the position of a cursor on a computer display, comprising:

a cursor control device under control of a user to generate electrical signals corresponding to the desired movement of the cursor on the computer display;

cursor position means responsive to said electrical signals for generating first and second orthogonal control signals to control the movement of the cursor in first and second corresponding orthogonal directions on the computer display;

a control storage area storing position data corresponding to a control position on the computer display; and alteration means for altering said control signals in response to said current position of the cursor being in proximity with said control position, said alteration means adding first and second orthogonal correction vectors to said first and second control signals, respectively, to cause the cursor to move incrementally closer to said control position than would result from the unaltered control signals.

2. The system of claim 1 wherein said first and second correction vectors have a constant magnitude and a direction substantially toward said control position.

3. The system of claim 1 wherein said first and second correction vectors have a magnitude dependent on a distance between said current location of the cursor and said control position, and a direction substantially toward said control position.

4. The system of claim 1 wherein said control storage area stores position data corresponding to first and second control positions on the computer display, said first control position having a first designated value and said second control position having a second designated value, and said alteration means adds first and second correction signals to said control signals, said first and second correction signals each having a correction value corresponding to said first and second designated values, respectively.

5. The system of claim 4 wherein said cursor position means generates first and second control signals corresponding to first and second orthogonal directions of movement of the cursor on the computer display, respectively, said first and second correction vectors being added to said first and second control signals, respectively, to cause the cursor to move toward one of said first and second control positions having a greater designated value.

6. The system of claim 5 wherein said first and second correction vectors have a magnitude dependent on said first and second designated values, respectively.

7. The system of claim 5 wherein said first and second correction vectors each have a magnitude dependent on a distance between said current location of the cursor and said first and second control positions, and a direction toward said one of said first and second control positions with a greater designated value.

8. The system of claim 4, further including value alteration means for altering said first and second designated values.

9. The system of claim 8 wherein said value alteration means alters said first designated value based on a previous selection of said first control position.

10. A system for controlling the position of a cursor on a computer display, comprising:

a cursor control device under control of a user to generate electrical signals corresponding to the desired movement of the cursor on the computer display;

a cursor storage area storing position data corresponding to a current position of the cursor on the computer display;

cursor position means responsive to said electrical signals for generating first and second orthogonal control signals to control the movement of the cursor in first and second corresponding orthogonal directions on the computer display;

a control storage area storing position data corresponding to a control position on the computer display, said control position being substantially surrounded by a threshold spaced apart from said control position at a predetermined distance; and alteration means for altering said control signals when said current cursor position is between said threshold and said control position, said alteration means adding first and second orthogonal correction signals to said first and second control signals, respectively, to cause the cursor to move toward said control position.

11. A method for controlling cursor movement on a computer display coupled to a computer using a cursor control device, the method comprising the steps of:

detecting command signals generated by the cursor control device in response to user input on the cursor control device to move the cursor on the computer display;

in response to said command signals, generating cursor first and second orthogonal positioning signals to move the cursor in first and second corresponding orthogonal directions on the computer display;

detecting a current position of the cursor in proximity with a control position on the computer display; and in response to said current cursor position being detected in proximity with said control position, altering said cursor positioning signals by adding first and second orthogonal correction signals to said first and second cursor positioning signals, respectively, to cause the cursor to move incrementally closer to said control position than would result from the unaltered cursor positioning signals.

12. The method of claim 11 wherein said step of altering is repeated until said current cursor position substantially coincides with said control position.

13. A method for controlling cursor movement on a computer display coupled to a computer using a cursor control device, the method comprising the steps of:

detecting command signals generated by the cursor control device in response to user input on the cursor control device to move the cursor on the computer display;

in response to said command signals, generating first and second orthogonal cursor positioning signals to move the cursor in first and second corresponding orthogonal directions on the computer display;

detecting a current position of the cursor in proximity with a control position on the computer display; and in response to said current cursor position being detected in proximity with said control position, continuously altering said first and second cursor positioning signals following said step of generating said first and second cursor positioning signals by adding first and second orthogonal correction signals to said first and second cursor positioning signals, respectively, to cause the cursor to move progressively closer to said control position until said cursor position substantially coincides with said control position.

14. A method for controlling cursor movement on a computer display coupled to a computer using a cursor control device, the method comprising the steps of:

detecting command signals generated by the cursor control device in response to user input on the cursor control device to move the cursor on the computer display;

in response to said command signals, generating first and second orthogonal cursor positioning signals to move the cursor in first and second corresponding orthogonal directions on the computer display;

detecting a current position of the cursor within a threshold area spaced apart from a control position on the computer display, said control position being substantially surrounded by said threshold area at a predetermined distance; and in response to said current cursor position being detected within said threshold area, altering said first and second cursor positioning signals by adding first and second orthogonal correction signals to said first and second cursor positioning signals, respectively, to cause the cursor to move closer to said control position.

* * * * *